United States Patent
Trevillyan (10) Patent No.: US 12,123,807 B2
(45) Date of Patent: *Oct. 22, 2024

(54) FLUID DETECTION FABRIC

(71) Applicant: Trevillyan Labs, LLC, Mountain View, CA (US)

(72) Inventor: William George Trevillyan, Mountain View, CA (US)

(73) Assignee: TREVILLYAN LABS, LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/465,551

(22) Filed: Sep. 12, 2023

(65) Prior Publication Data
US 2023/0417621 A1 Dec. 28, 2023

Related U.S. Application Data (62) Division of application No. 17/350,288, filed on Jun. 17, 2021, now Pat. No. 11,788,918.

(60) Provisional application No. 63/040,636, filed on Jun. 18, 2020.

(51) Int. Cl.
*G01M 3/16* (2006.01)
*G01M 3/20* (2006.01)

(52) U.S. Cl.
CPC ............... *G01M 3/20* (2013.01); *G01M 3/16* (2013.01)

(58) Field of Classification Search
None
See application file for complete search history.

(56) References Cited

U.S. PATENT DOCUMENTS

| | | | |
|---|---|---|---|
| 3,039,295 A | 6/1962 | Le et al. |
| 3,107,517 A | 10/1963 | Loyd et al. |
| 3,991,625 A | 11/1976 | Preston |
| 3,997,783 A | 12/1976 | Boutaine et al. |
| 4,029,044 A | 6/1977 | Hunter |
| 4,116,023 A | 9/1978 | Sando et al. |
| 4,270,049 A | 5/1981 | Tanaka et al. |
| 4,561,292 A | 12/1985 | Pugnale et al. |
| 5,039,279 A | 8/1991 | Natwick et al. |

(Continued)

FOREIGN PATENT DOCUMENTS

| CA | 2104204 A1 | 2/1995 |
|---|---|---|
| CA | 2512130 A1 | 1/2007 |

(Continued)

OTHER PUBLICATIONS

Aziz, Shahid ; Chang, Seung-Hwan. Smart-fabric sensor composed of single-walled carbon nanotubes containing binary polymer composites for health monitoring. Composites science and technology, Jul. 28, 2018, vol. 163, p. 1-9.

(Continued)

*Primary Examiner* — Alexander A Mercado
(74) *Attorney, Agent, or Firm* — Goodhue, Coleman & Owens, P.C.

(57) ABSTRACT

A fluid detection system, method, and apparatus are disclosed. A fluid detection fabric includes a top layer, a middle layer, a bottom layer, a fluid detection sensor, and a control hub. The middle layer separates the top layer and bottom layer. The top layer, middle layer, and bottom layer are configured to connect electrically using a liquid pathway when liquid is present.

12 Claims, 10 Drawing Sheets

(56) References Cited

U.S. PATENT DOCUMENTS

| | | |
|---|---|---|
| 5,245,860 A | 9/1993 | Chang et al. |
| 5,329,081 A | 7/1994 | Jones |
| 5,378,995 A | 1/1995 | Kudo et al. |
| 5,390,531 A | 2/1995 | Taylor |
| 5,537,095 A | 7/1996 | Dick |
| 5,561,418 A | 10/1996 | Croft et al. |
| 5,790,036 A | 8/1998 | Fisher et al. |
| H1761 H | 12/1998 | Manion et al. |
| 5,897,672 A | 4/1999 | Badami et al. |
| 6,098,457 A | 8/2000 | Poole |
| 6,127,930 A | 10/2000 | Steffanus |
| 6,175,310 B1 | 1/2001 | Gott |
| 6,260,517 B1 | 7/2001 | Powers et al. |
| 6,305,423 B1 | 10/2001 | Meyer et al. |
| 6,310,555 B1 | 10/2001 | Stern |
| 6,311,547 B1 | 11/2001 | Nitecki |
| 6,336,348 B1 | 1/2002 | Lee et al. |
| 6,367,096 B1 | 4/2002 | Quintana |
| 6,419,807 B1 | 7/2002 | Davies et al. |
| 6,456,197 B1 | 9/2002 | Lauritsen et al. |
| 6,794,590 B2 | 9/2004 | Federspiel |
| 6,810,732 B2 | 11/2004 | Shon |
| 7,040,142 B2 | 5/2006 | Burbank |
| 7,073,794 B2 | 7/2006 | Bock et al. |
| 7,111,497 B2 | 9/2006 | Goad et al. |
| 7,124,772 B1 | 10/2006 | Browning |
| 7,217,891 B2 | 5/2007 | Fischer et al. |
| 7,228,726 B2 | 6/2007 | Kates |
| 7,292,155 B2 | 11/2007 | Vokey et al. |
| 7,360,392 B2 | 4/2008 | Konzelmann et al. |
| 7,423,542 B1 | 9/2008 | Mitsis et al. |
| 7,760,105 B2 | 7/2010 | Turner |
| 8,022,267 B2 | 9/2011 | Hellström et al. |
| 8,024,967 B2 | 9/2011 | Burdi et al. |
| 8,289,173 B2 | 10/2012 | Ben-Mansour et al. |
| 8,372,506 B2 | 2/2013 | Vainshtein |
| 8,404,478 B2 | 3/2013 | Harttig et al. |
| 8,438,908 B2 | 5/2013 | Howieson |
| 8,508,373 B2 | 8/2013 | Rice |
| 8,679,849 B2 | 3/2014 | Zhang et al. |
| 8,701,467 B2 | 4/2014 | Carns et al. |
| 8,756,828 B2 | 6/2014 | Dalton et al. |
| 8,966,997 B2 | 3/2015 | Taylor |
| 9,129,513 B1 | 9/2015 | Clarke et al. |
| 9,188,501 B2 | 11/2015 | Bley et al. |
| 9,192,720 B2 | 11/2015 | Chappel et al. |
| 9,304,056 B2 | 4/2016 | Albaladejo et al. |
| 9,460,353 B2 | 10/2016 | Rankin et al. |
| 9,528,903 B2 | 12/2016 | Zusman |
| 9,695,593 B2 | 7/2017 | Vokey et al. |
| 9,772,250 B2 | 9/2017 | Richarz et al. |
| 10,078,030 B2 | 9/2018 | Wassarman |
| 2004/0067481 A1 | 4/2004 | Leonard et al. |
| 2005/0092070 A1 | 5/2005 | Bhatti |
| 2005/0126264 A1 | 6/2005 | Komninos |
| 2005/0126282 A1 | 6/2005 | Maatuk |
| 2005/0210968 A1 | 9/2005 | Grell |
| 2006/0012485 A1 | 1/2006 | Tacilauskas |
| 2006/0042375 A1 | 3/2006 | Davis |
| 2006/0191323 A1 | 8/2006 | Garabedian et al. |
| 2006/0200916 A1 | 9/2006 | France et al. |
| 2006/0236487 A1 | 10/2006 | Dean |
| 2007/0024458 A1 | 2/2007 | McGinty et al. |
| 2007/0157705 A1 | 7/2007 | Bilstad et al. |
| 2007/0169374 A1 | 7/2007 | Hamman |
| 2008/0041150 A1 | 2/2008 | Lohr et al. |
| 2008/0055112 A1 | 3/2008 | McGinty et al. |
| 2008/0283395 A1 | 11/2008 | Rhee et al. |
| 2009/0021904 A1 | 1/2009 | Yang |
| 2009/0272197 A1 | 11/2009 | Granado et al. |
| 2010/0302047 A1 | 12/2010 | Wood |
| 2011/0048555 A1 | 3/2011 | Malouf et al. |
| 2011/0093220 A1 | 4/2011 | Yang et al. |
| 2011/0142688 A1 | 6/2011 | Chappel et al. |
| 2011/0171618 A1 | 7/2011 | Esteve et al. |
| 2011/0259802 A1 | 10/2011 | Wieczorek et al. |
| 2012/0197565 A1 | 8/2012 | Gunness |
| 2012/0285221 A1 | 11/2012 | Al-Qahtani et al. |
| 2013/0016357 A1 | 1/2013 | Cheim |
| 2013/0041601 A1 | 2/2013 | Dintakurti et al. |
| 2013/0333447 A1 | 12/2013 | White et al. |
| 2014/0059837 A1 | 3/2014 | Schroers |
| 2014/0090489 A1 | 4/2014 | Taylor |
| 2015/0268126 A1 | 9/2015 | Jordan |
| 2015/0292964 A1 | 10/2015 | Sibbett |
| 2015/0308027 A1 | 10/2015 | Chang |
| 2017/0038322 A1 | 2/2017 | Cobanoglu et al. |
| 2017/0205308 A1* | 7/2017 | Wassarman ............. G01M 3/16 |
| 2017/0248513 A1 | 8/2017 | Liu et al. |
| 2018/0024023 A1 | 1/2018 | Yoshitomi |
| 2020/0333276 A1 | 10/2020 | Ikoma |
| 2020/0393321 A1 | 12/2020 | Shevelow |
| 2021/0270691 A1 | 9/2021 | Shah |
| 2021/0310892 A1 | 10/2021 | Shevelow |
| 2022/0307166 A1 | 9/2022 | Marchesi |

FOREIGN PATENT DOCUMENTS

| | | |
|---|---|---|
| CA | 2596531 A1 | 2/2008 |
| CN | 2442258 Y | 8/2001 |
| CN | 1433461 A | 7/2003 |
| CN | 2862023 Y | 1/2007 |
| CN | 200993647 Y | 12/2007 |
| CN | 101149325 A | 3/2008 |
| CN | 101196511 A | 6/2008 |
| CN | 101609055 A | 12/2009 |
| CN | 101865754 A | 10/2010 |
| CN | 101105262 B | 8/2011 |
| CN | 102628226 A | 8/2012 |
| CN | 202393671 U | 8/2012 |
| CN | 102778336 A | 11/2012 |
| CN | 102908126 A | 2/2013 |
| CN | 103115564 B | 5/2013 |
| CN | 203365283 U | 12/2013 |
| CN | 103760325 A | 4/2014 |
| CN | 203635497 U | 6/2014 |
| CN | 103196964 B | 12/2014 |
| CN | 204128923 U | 1/2015 |
| CN | 104257232 B | 4/2016 |
| CN | 104897513 B | 6/2016 |
| CN | 105931246 A | 9/2016 |
| CN | 107248152 A | 10/2017 |
| DE | 102014211928 A1 | 12/2015 |
| EP | 0341932 A2 | 11/1989 |
| EP | 0647551 B1 | 1/1998 |
| EP | 0947402 A3 | 12/1999 |
| EP | 1217342 A2 | 6/2002 |
| EP | 0934513 B1 | 12/2002 |
| EP | 1591780 A2 | 11/2005 |
| EP | 1621863 A2 | 2/2006 |
| EP | 1624298 A2 | 2/2006 |
| EP | 1764601 A1 | 3/2007 |
| EP | 1760444 A3 | 3/2009 |
| EP | 1879007 B1 | 8/2009 |
| EP | 2644079 A1 | 10/2013 |
| EP | 2757359 B1 | 4/2017 |
| EP | 2982337 B1 | 8/2020 |
| WO | 1994002772 A1 | 2/1994 |
| WO | 1998020330 A1 | 5/1998 |
| WO | 1999002985 A1 | 1/1999 |
| WO | 2001094825 A2 | 12/2001 |
| WO | 2002101343 A2 | 12/2002 |
| WO | 2006017161 | 4/2006 |
| WO | 2012028685 A1 | 3/2012 |
| WO | 2012032233 A1 | 3/2012 |
| WO | 2013164558 A1 | 11/2013 |
| WO | 2014132018 A1 | 9/2014 |
| WO | 2015014774 A1 | 2/2015 |
| WO | 2015104076 A1 | 7/2015 |
| WO | 2016073679 A1 | 5/2016 |
| WO | 2016129750 A1 | 8/2016 |

(56) References Cited

FOREIGN PATENT DOCUMENTS

| WO | 2016168543 A1 | 10/2016 |
| WO | 2016196095 A1 | 12/2016 |

OTHER PUBLICATIONS

Chun, Sungwoo ; Son, Wonkyeong ; Kim, Da Wan ; Lee, Jihyun ; Min, Hyeongho ; Jung, Hachul ; Kwon, Dahye ; Kim, A-Hee ; Kim, Young-Jin ; Lim, Sang Kyoo ; Pang, Changhyun ; Choi, Changsoon. Water-Resistant and Skin-Adhesive Wearable Electronics Using Graphene Fabric Sensor with Octopus-Inspired Microsuckers. ACS applied materials & interfaces, May 8, 2019, vol. 11 (18), p. 16951-16957.

Foo, Esther W.; Pettys-Baker, Robert Mt; Sullivan, Shawn; and Dunne, Lucy E. Garment-integrated wetness sensing for leak detection. Association for Computing Machinery. 2017, 8 pages.

Introduction to smart textiles and their applications, https://www.sciencedirect.com/topics/materials-science/smart-textiles, 330 pages.

Nolan, A ; Speers, Samuel J ; Murakami, Julie ; Chapman. A pilot study: The effects of repeat washing and fabric type on the detection of seminal fluid and spermatozoa, Brendan Forensic science international, Aug. 2018, vol. 289, p. 51-56.

P. Cumberland, C. O.R. Everard et al. Assessment of the efficacy of an IgM-elisa and microscopic agglutination test (MAT) in the diagnosis of acute leptospirosis. Am. J. Trop. Med. Hyg., 61(5), 1999, pp. 731-734.

Ron Dechene. Optimized Emission Control. Ceramic industry, Aug. 1, 2007, vol. 157 (8), p. 32.

Tonmoy ; Hongrui Jiang ; Behdad. A Fluidic Colorimetric Sensor Design for Water Hardness Detection Bhattacharjee. Nader IEEE sensors journal, Feb. 2015, vol. 15 (2), p. 819-826.

V. A. Ho, M. Makikawa and S. Hirai, "Flexible Fabric Sensor Toward a Humanoid Robot's Skin: Fabrication, Characterization, and Perceptions," in IEEE Sensors Journal, vol. 13, No. 10, pp. 4065-4080, Oct. 2013, doi: 10.1109/JSEN.2013.2272336.

Yoon, Bora ; Liu, Sophie F ; Swager, Timothy M. Surface-Anchored Poly(4-vinylpyridine)—Single-Walled Carbon Nanotube—Metal Composites for Gas Detection. Chemistry of materials, Aug. 23, 2016, vol. 28 (16), p. 5916-5924.

Yu, Guoqiang. Copper Ion Detection in Drinking Water via a Fabric Nanocomposite Sensor. Lamar University—Beaumont. ProQuest Dissertations Publishing, 2017. 10619517. 35 pages.

* cited by examiner

FLUID DETECTION FABRIC

CROSS-REFERENCE TO RELATED APPLICATIONS

This application is a divisional of non-provisional application Ser. No. 17/350,288 filed Jun. 17, 2021 which claims priority under 35 U.S.C. § 119 to provisional application Ser. No. 63/040,636 filed on Jun. 18, 2020, which are incorporated by reference in their entirety.

FIELD OF THE DISCLOSURE

The present disclosure relates to leak detection. More particularly, but not exclusively, the present disclosure relates to a FLUID DETECTION FABRIC with the ability to detect small quantities over a large area.

BACKGROUND

When systems, containing fluid, undergo issues which produce leaks or the releasement of the fluid, the fluid can damage the surrounding environment, human health, nearby machinery, or electrical systems. If a small amount of fluid (less than 0.1 mL over a few hours) is released, damage can occur and propagate over time. Current fluid sensor or fluid detection technology does not have the ability to quickly detect the presence of leaked fluids in small quantities over large areas with a high-level reliability, consistency, and accuracy. Therefore, what is needed is a method, system, and apparatus for detecting small amounts of fluid.

SUMMARY

Therefore, it is a primary object, feature, or advantage of the present disclosure to improve over the state of the art.

It is a further object, feature, or advantage of the present disclosure to detect small amount of liquid over a large area.

It is a still further object, feature, or advantage of the present disclosure to detect leaks by measuring voltage.

It is a still further object, feature, or advantage of the present disclosure to direct fluid from the top layer of the fabric to the bottom layer of the fabric using stitching.

Another object, feature, or advantage is to pinpoint the location of a small leak in a large area.

Yet another object, feature, or advantage is to convert non-conductive fluid into conductive fluid.

In one aspect of the present disclosure a fluid detection system for detecting liquid leaks is disclosed. The fluid detection system includes, for example, a fluid detection fabric, the fluid detection fabric includes a top layer, a middle layer, and a bottom layer, a first wire connected to the top layer, and a second set of wires connected to the bottom layer, and a fluid detection sensor. The top layer, the middle layer and the bottom layer are configured to connect if liquid leaks on at least one of the top layer, middle layer, and bottom layer. The fluid detection sensor is configured to detect if liquid is on the fluid detection fabric. The fluid detection system also includes, for example, a control hub having an input pin connected to the first wire, the input pin configured to apply a voltage, output pins connected to the second set of wires, the output pins configured to measure an increase in voltage, wherein the control hub is configured to receive sensor measurements from the fluid detection sensor through the second set of wires. The fluid detection fabric is configured to increase the applied voltage after fluid is detected on the top layer, middle layer, or bottom layer.

In another aspect of the present disclosure, a fluid detection fabric is disclosed. The fluid detection fabric includes, for example, a top layer of conductive material, a middle layer of non-conductive material, and a bottom layer of conductive material. The middle layer separates the top layer and bottom layer. The top layer, middle layer, and bottom layer are configured to connect when liquid is present. The fluid detection fabric has a plurality of stitches wherein at least one stitch of the plurality of stitches connects the top layer to the middle layer and at least one of the plurality of stitches connects the middle layer to the bottom layer. The fluid detection fabric also includes a first wire connected to the top layer and a second set of wires connected to the bottom layer. The first wire or the second set of wires are configured to apply a voltage, and the first wire or second set of wires is configured to transmit an increased voltage.

In one other aspect of the present disclosure a method for detecting a liquid leak is disclosed. The method includes steps such as, for example, sending an applied voltage to the fluid detection fabric by a control hub through a first wire connected to the fluid detection fabric and the control hub, monitoring the voltage reading by the control hub through a second wire connected to the fluid detection fabric and the control hub, detecting fluid on the fluid detection fabric by a fluid detection sensor, connecting a top layer, middle layer, and a bottom layer of the fluid detection fabric, sensing an increased voltage sensor measurement by the fluid detection sensor, and determining by a processor of the control hub that fluid is leaking on the fluid detection fabric utilizing the increased voltage sensed by the fluid detection sensor.

One or more of these and/or other objects, features, or advantages of the present disclosure will become apparent from the specification and claims that follow. No single aspect need provide each and every object, feature, or advantage. Different aspects may have different objects, features, or advantages. Therefore, the present disclosure is not to be limited to or by any objects, features, or advantages stated herein.

BRIEF DESCRIPTION OF THE DRAWINGS

Illustrated aspects of the disclosure are described in detail below with reference to the attached drawing figures, which are incorporated by reference herein.

DETAILED DESCRIPTION

The disclosure is not to be limited to the aspects described herein. In particular, the disclosure contemplates numerous variations in fluid detection fabrics apparatus, systems, and methods. The foregoing description has been presented for purposes of illustration and description. It is not intended to be an exhaustive list or limit any of the disclosure to the precise forms and aspects disclosed. It is contemplated that other alternatives or exemplary aspects are considered included in the disclosure. The description is merely examples of formulations, components, constructs, processes, or methods of the disclosure. It is understood that any other modifications, substitutions, and/or additions can be made, which are within the intended spirit and scope of the disclosure.

Figure 1:
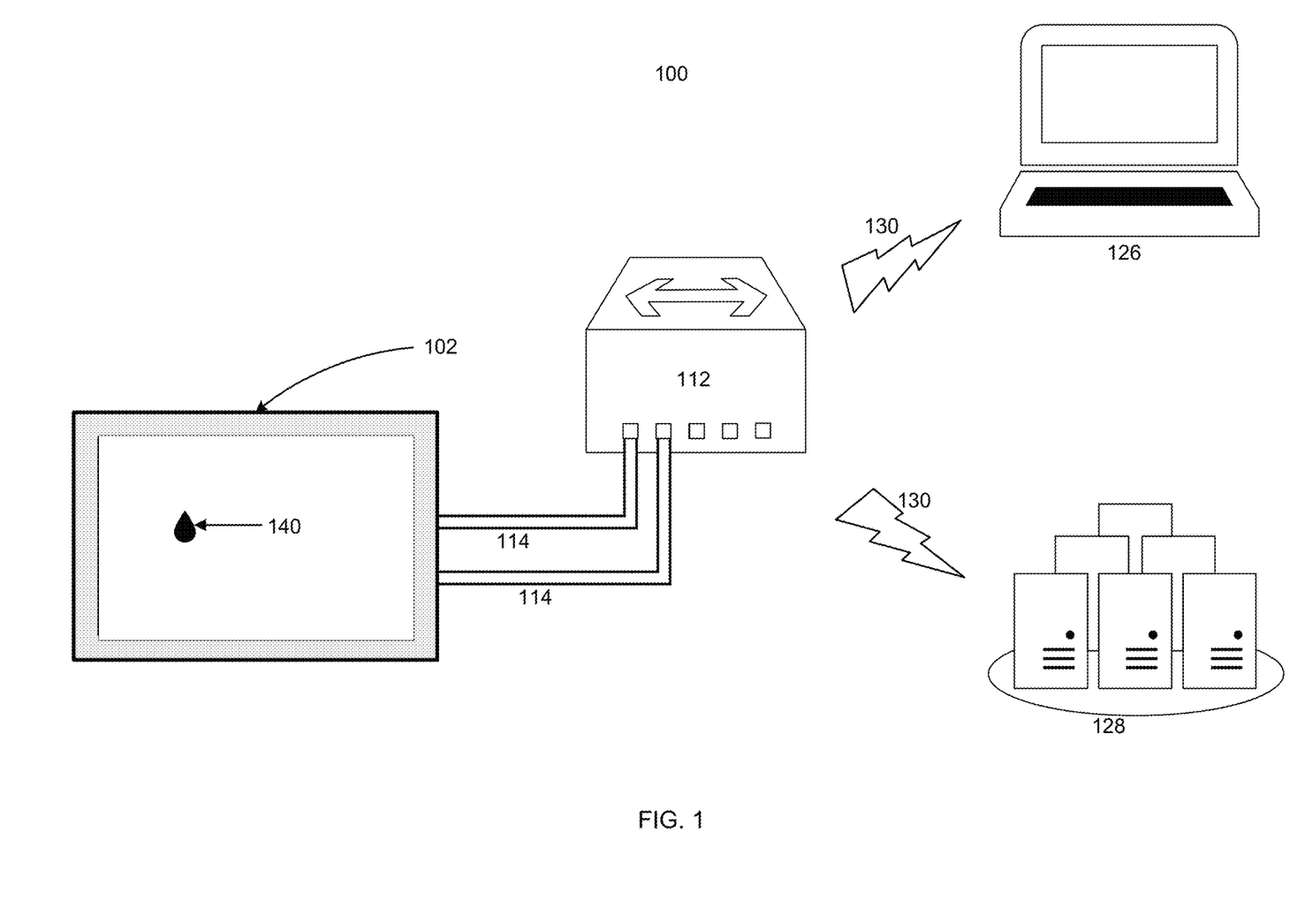
FIG. 1 is an illustration of the fluid detection system in accordance with an exemplary aspect the present disclosure.
Figure 2:
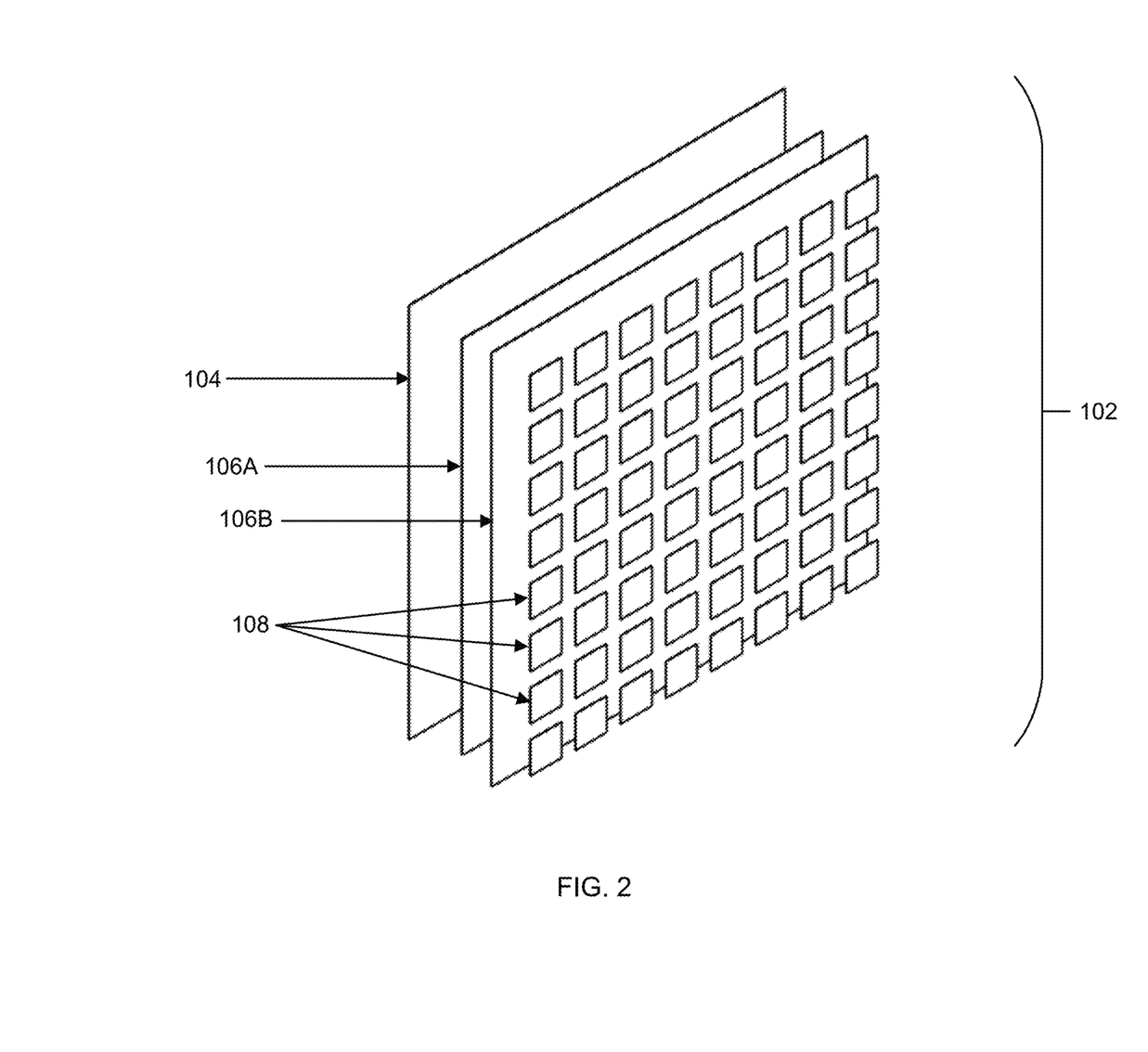
FIG. 2 illustrates the fluid detection fabric in accordance with an exemplary aspect of the present disclosure.

In one aspect of the present disclosure a fluid detection system 100, is disclosed, as shown in FIG. 1. The fluid detection fabric 102 includes a top layer 104, a middle layer 106, a bottom layer 108, a fluid detection sensor 110, and a control hub 112. A method and apparatus for detecting fluid leaks using the fluid detection system 100 are also disclosed.

When systems, containing fluid, undergo issues which produce leaks or the releasement of the fluid, the fluid can damage the surrounding environment, human health, nearby machinery, or electrical systems. If a small amount of fluid (less than 0.1 mL over a few hours) is released, damage can occur and propagate over time.

The fluid detection system 100 can be used with microreactors within chemical plants. Micro-reactors are small reactors typically used for producing expensive chemicals that are hazardous and required in small amounts. For example, nanoparticles or drugs get produced in microreactors. If these have leaks, there may be potential hazards in terms of human health and safety. With hundreds of tubes running all over, it can be difficult to track leaks. The fluid detection fabric may be placed in or around the microreactors to track or detect extremely small leaks over a large area. The fluid detection system 100 can detect if there are pin-hole leaks in any of the piping below a sink. These leaks can go undetected causing wood to rot and mold to form propagating the damage. The fluid detection fabric 102 may be placed around the pipes to track or detect extremely small leaks over a large area. If any building owner or manager wants to be able to detect water underneath their carpet or flooring, fluid detection fabric 102 can be installed below the carpet to be able to detect water immediately. Ceiling tiles could be lined with fluid detecting fabric to identify areas of water leaks. For parents who want to know immediately that their baby has a wet diaper, the fluid detection fabric could be used as a sensor to detect a wet diaper.

Figure 3:
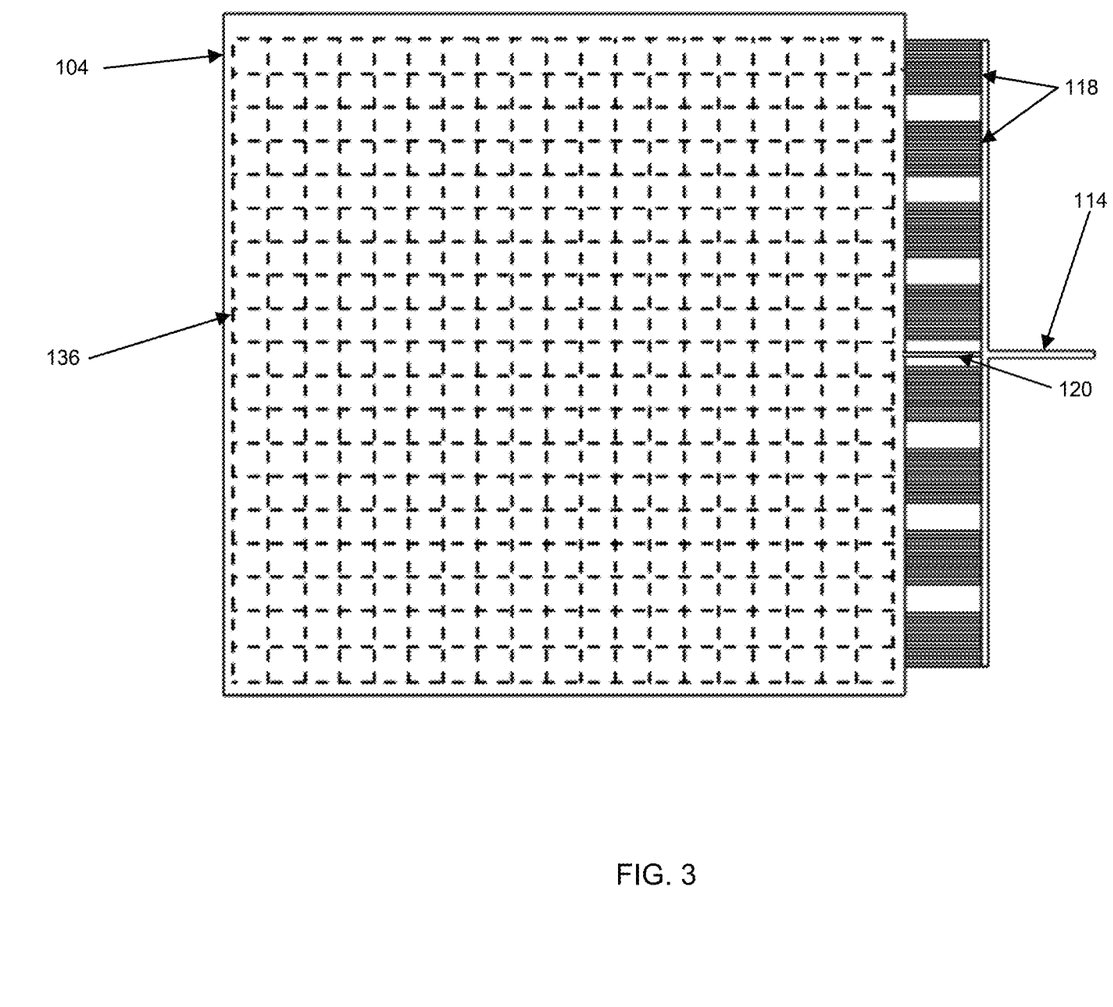
FIG. 3 is an illustration of the top layer of the fluid detection fabric.
Figure 4:
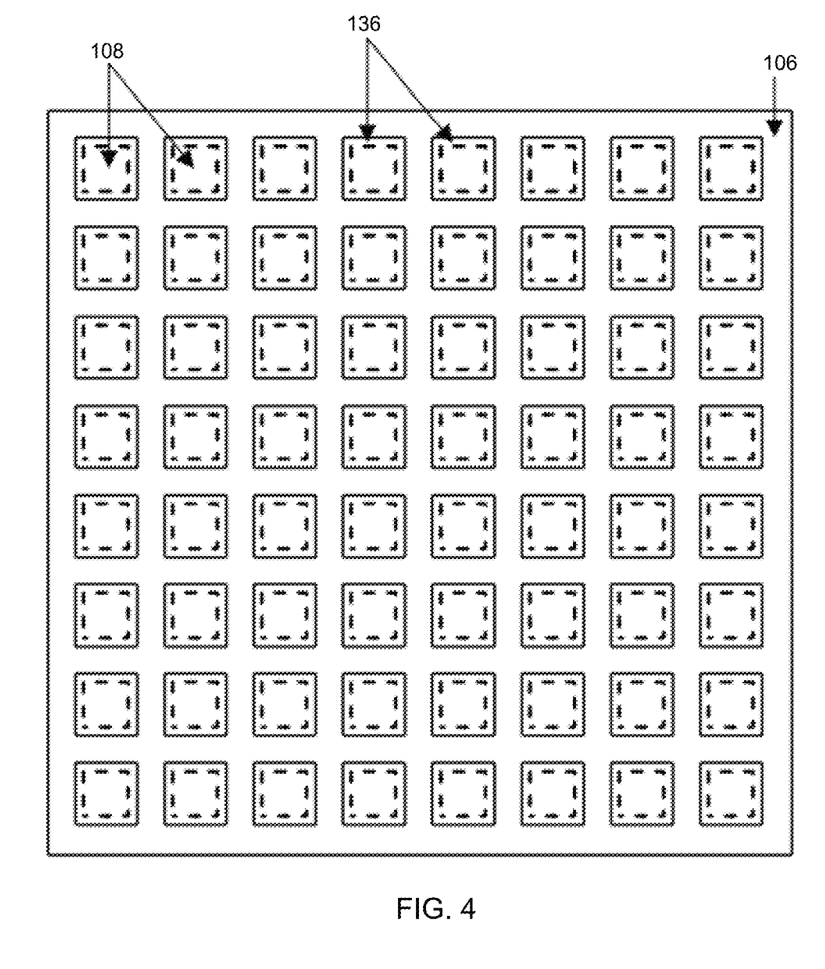
FIG. 4 is an illustration of the bottom layer and middle layer of the fluid detection fabric.

In one aspect, the fluid detection system 100 disclosed may be a fluid detection fabric 102 which may be used as a sensor covering large areas to detect the presence of fluids 140. The fluid detection fabric 102 can be made into any size, shape, or dimension. The fluid detection fabric 102 may include fabric constructed with two general materials: an electrically conductive cloth and an electrically non-conductive cloth. The fluid detection fabric 102 may have at least three layers, a top layer 104, a middle layer 106, and a bottom layer 108, as shown in FIGS. 2-9. The top layer 104, as shown in FIG. 3, and the bottom layer 108, as shown in FIG. 4, may be fabricated from electrically conductive cloth. The fluid detection system 100 may include at least three layers sewn or glued together in such a way to ensure that the top layer 104 and bottom layer 108 do not touch or conduct electricity to each other. The middle layer 106 separates the top layer 104 and the bottom layer 108. The middle layer 106 may include a top middle layer 106A and a bottom middle layer 106B.

Conductors 114 or any form of electrical connection may be attached to each of the top layer 104 and the bottom layer 108 as shown in FIGS. 3, 5, 7 and 8. Conductors 114 could be a wire, a pin, a ribbon, a strip of conductor, solder, leads to the circuit board, microcontroller, or control hub, conductive fabric, and other suitable conductors. The conductors 114 may include at least one input pin 120 and one or more output pins 118. The non-conductive fabric used for the middle layer 106 may be cotton, a woven non stretch fabric, an elastane jersey fabric, tulle, organza synthetic, toile fabric, yarn, neoprene, or any other nonconductive fabric. In some examples the fabric may be cotton voile gauze fabric. The non-conductive or conductive fabric may be able to absorb fluids quickly. The top layer 104, middle layer 106 or bottom layer 108 may be made of non-polar (hydrophobic) or polar (hydrophilic) material. The layers need to absorb fluids easily as well. The one or more conductive layers are coated or blended with conductive metals. Suitable metals having conductive properties are contemplated. Some metals with conductive properties include, for example, gold, carbon, tin, silicon, titanium, nickel, silver, or copper. The conductive layer fabric may include cotton, wool, polyester, nylon, or any other fabric containing conductive fibers. The top layer 104 or bottom layer 108 may have conductive rows, columns, or shapes. The conductive rows, columns or shapes may be conductive stitching material, as shown in FIGS. 3, 4, and 9. The conductive rows may be perpendicular to each other. The bottom layer 108 may include a different conductive material than the top layer 104. In some aspects the top layer 104 may include silver fiber conductive mesh fabric and the bottom layer 108 may include radiation shielding material or radio frequency identification information anti-theft fabric comprising nano ion silver fiber.

The top middle layer 106A, may be sewn or stitched together with the top layer 104 in order to create a path 138 for fluid 140 to flow along the stitching 136. This path 138 can allow smaller quantities of the fluid 140, such as a single drop of fluid 140, to move through each of the layers due to the adhesive nature between a fluid and a fabric or stitch 136 that has the same polarity as the fluid 140. An increased density for the stitching 136 pattern increases the resolution of the fluid detection sensor 110 allowing for smaller quantities of the fluid 140 to be detected, such as a single drop. In addition to the top middle layer 106A being stitched, the bottom middle layer 106B may be stitched to a grid of conductive fabric squares, which may be the bottom layer 108, which allows for the detection of the fluid 140 and the identification of the fluid's location.

The control and sensitivity of the fluid detection sensor 110 or fluid detection fabric 102 may be determined by a set of parameters that may include the material of which each of the layers are made, the polarity or hydrophobic or hydrophilic nature of each of the layers, the material of the stitching, the polarity or hydrophobic or hydrophilic nature of the stitching 136, the density or proximity of the each stitch 136 to one another, the orientation of the stitching 136, or the configuration of the stitching 136.

The polarity and hydrophobic/hydrophilic nature of the material of each of the layers 104, 106, and 108 and the stitching may affect the sensitivity of the fluid detection sensor 110 or fluid detection fabric 102. The top layer 104 and bottom layer 108 may include polar and hydrophilic conductive fabric to detect a polar fluid 140. The middle layer 106, 106A, and 106B may include non-conductive fabric that is polar and hydrophilic. The stitching 136 connecting the middle layer 106 or the bottom middle layer 106B to the bottom layer 108 or the top layer 104 may include material that is hydrophilic and polar. The hydrophilic nature of the layers 104, 106, and 108 as well as the stitching 136 attracts a hydrophilic fluid 140, allowing the fluid 140 to be directed towards a fluid detection sensor 110 such as the conductors 114 or a section of the bottom layer 108A, 108B, 108C or 108D. The stitching pattern 136 may act as an aqueduct channeling or directing water towards the fluid detection sensor 110 or the bottom layer 108. In another aspect of detecting a fluid leak, the top layer 104, bottom layer 108, and middle layer 106, 106A, 106B may be a non-polar and hydrophobic material. The stitching 136 material may also be non-polar and hydrophobic. The hydrophobic nature of the material may direct non-polar, hydrophobic liquid towards the fluid detection sensor 110, conductors 114, or bottom layer 108.

To detect a fluid 140 that is polar and hydrophilic, the top layer 104 and the bottom layer 108 material may be hydrophobic and non-polar. The middle layer 106, 106A, and 106B material may be hydrophilic and polar. The stitching 136 connecting at least the middle layer 106 to the bottom of the middle layer 106B may be made of polar and hydrophilic material. The fluid 140 may be directed away from the top layer 104 and the bottom layer 108 but attracted to both the middle layer 106 and the stitching 136. The stitching 136 may direct the fluid 140 towards the fluid detection sensor 110 or bottom layer 108 where the fluid 140 may be detected by an increase or decrease in voltage or any other method of sensing. To detect a fluid 140 that is non-polar or hydrophobic, the top layer 104 and the bottom layer 108 material may be polar or hydrophilic. The middle layer, 106, 106A, and 106B, material may be hydrophobic or non-polar. The stitching 136 connecting at least the middle layer 106 or the bottom or the top of the middle layer 106B or 106A may be made of non-polar or hydrophobic material. The stitching 136 connecting at least the middle layer 106 or the bottom or the top of the middle layer 106B or 106A may be made of polar and hydrophilic material. The fluid 140 may be directed away from the top layer 104 and the bottom layer 108 but attracted to both the middle layer 106 and the stitching 136.

To detect a fluid 140 that is polar and hydrophilic, the top layer 104, middle layer 106, 106A, 106B and the bottom layer 108 material may be hydrophobic and non-polar. The stitching 136 connecting at least the middle layer 106 to the bottom of the middle layer 106B may be made of polar and hydrophilic material. The fluid 140 may be directed away from the top layer 104, middle layer 106 and the bottom layer 108 but attracted to the stitching 136. The stitching 136 may direct the fluid 140 towards the fluid detection sensor 110 or the bottom layer 108 where the fluid 140 may be detected by an increase or decrease in voltage or any other method of sensing. To detect a fluid 140 that is non-polar or hydrophobic, the top layer 104, middle layer 106, 106A, 106B and the bottom layer 108 material may be polar or hydrophilic. The stitching 136 connecting at least the middle layer 106 or the bottom or the top of the middle layer 106B or 106A may be made of non-polar or hydrophobic material. The stitching 136 connecting at least the middle layer 106 or the bottom or the top of the middle layer 106B or 106A may be made of polar and hydrophilic material. The fluid 140 may be directed away from the top layer 104 and the bottom layer 108 but attracted to the stitching 136.

The orientation and pattern or configuration of the stitching 136 may also affect the sensitivity of the fluid detection sensor 110 or fluid detection fabric 102. The orientation of the stitching 136 can be horizontal, vertical, diagonal, curved or curvy, looped, form a shape or design, incorporate at least two or more listed orientations, or include any other stitch style or orientation. In addition, the configuration or pattern could be a hexagonal stitch, circular stitch or a triangular stitch. The stitching 136 can include any shape or pattern that allows for detecting leaking fluid 140. The orientation can direct the fluid 140 to the one or more fluid detection sensors 110 or aid in moving the fluid 140 from one layer of fabric to another through a pathway 138, such as from the top layer 104 to the middle layer 106 and from the middle layer 106 to the bottom layer 108, thus connecting the fabric layers and increasing the voltage. The configuration of the stitching 136 may also aid pooling the fluid 140 around the stitching 136 or within one or more configuration or shape created by the stitching 136 for increased fluid detection.

The density or proximity of a first stitch 136 to a second stitch 136 may affect the sensitivity of the fluid detection sensor 110 or fluid detection fabric 102. The distance between each thread 136 or stitch 136 may determine the resolution of the fluid detection sensor's 110 or fluid detection fabric's 102 sensitivity. When a drop of the fluid 140 falls on the fluid detection sensor 110 or fluid detection fabric 102 or is detected by the fluid detection sensor 110, the fluid 140 may need to make contact with at least one stitch 136 in order to be absorbed or transported through each layer of the fluid detection fabric 102. If there is a large portion of fluid 140 which gets spilled onto or detected by the fluid detection sensor 110 or the top layer 104, the weight of the fluid 140 may force itself to be absorbed or transported through each layer of the fabric. The stitching 136 of the fluid detection fabric 102, acting as an aqueduct or pathway 138, may direct the large portion of fluid 140 to one or more fluid detection sensors 110 or the bottom layer 108. The fluid 140 spilled or leaked on to the fluid detection fabric 102 may be a light-weight portion of fluid 140, such as a single drop, and the drop may make contact with at least one stitch 136 or thread in order to be absorbed by each layer and be detected by the fluid detection sensor 110.

With a higher density of stitching 136 in a certain orientation or shape, such as squares for example, the resolution or sensitivity increases for detecting the fluid 140 location. If needed, a fluid detection sensor 110 can be constructed with a highly dense stitching 136 pattern allowing for easy detection of small quantities of fluid 140 as shown in FIG. 4. As the distance between each thread or stitch 136 decreases, the resolution of fluid detection increases. For example, with a smaller distance, for example 0.5 cm, between each stitch 136, there is less fluid 140 required to spill on the fluid detection sensor 110 before the fluid detection sensor 110 detects the fluid 140 or before the fluid 140 is directed by at least one stitch 136 towards the fluid detection sensor 110. In another aspect of the present disclosure, the distance between two stitches may be 0.2 cm and a single drop of fluid 140 can trigger the fluid detection sensor 110. With a larger distance, for example an inch, the required amount of fluid 140 for detection could be a few milliliters compared to a few drops. In some aspects of the present disclosure, the polarity of stitch 136 must always be the same polarity of the fluid 140.

The stitch density, or distance between each thread in the stitch 136, may affect the sensitivity of the fluid detection sensor 110 because the polar thread can connect layer 104 (a conductive non-polar layer) with layer 106A (a non-conduct polar layer). The stitch 136 can act as a polar pipeline that may allow a polar fluid 140 to easily move through the non-polar fabric of the top layer 104 to the polar layer underneath, 106A. The middle layer 106 can be split into two parts, 106A and 106B. The fluid 140 that reaches 106A, may be easily absorbed into 106B when both 106A and 106B are the same material and polarity which are equivalent to the fluid's 140 polarity. Once the fluid 140 is absorbed into 106A, it may follow another stitch 136 or thread like a pipeline to layer 108 which may be a conductive non-polar layer. After the fluid 140 flows through each of the layers, 104 and 108 may be connected via the fluid and allowed to conduct electricity. The polarity used in the example above could be switched around while still allowing the same principle to apply. When there are opposing polarities within the fluid detection fabric 102, a stitch 136 with the same polarity as the fluid 140 can be used in the stitching 136 to allow the fluid to flow through all three layers 104, 106, and 108 of the fluid detection fabric 102.

In yet another aspect, the stitching 136 may include two materials. A first stitching 136 may be made of polar or hydrophilic and a second stitching 136 may be made of polar of non-polar or hydrophobic. This allows both a polar fluid 140 or a nonpolar fluid 140 to be drawn to the first stitching 136 or the second stitching 136 and flow through the material easily. The first stitching 136 may be in a first orientation, such as a vertical orientation, and the second stitching 136 may run in a second orientation, such as a horizontal. This may allow the polar fluid 140 to be drawn in a separate direction than the non-polar liquid 140.

Conductors 114 may be connected to a control hub 112. When the fluid 140 is absorbed into the fluid detection system 100, the fluid 140 may connect the top layer 104 with the top middle layer 106A, followed by the bottom middle layer 106B and finally, the bottom layer 108. The control hub 112 can detect the fluid 140 that is present by reading a voltage increase on the output pin 118 of the fluid detection sensor 110 or the conductor 114. The control hub 112 may also include an input pin 120 which supplies the applied voltage. When the voltage from one or more output pins 118 is greater than the input pin 120, the control hub 112 may signal that there is a leak. The conductors 114 connected to the bottom layer 108 may be connected to the one or more output pins 118 and the conductors 114 connected to the top layer 104 may be connected to at least one input pin 120. In some aspects, the conductors 114 connected to the top layer 104 may be connected to the one or more output pins 118 while the conductors 114 attached to the bottom layer 108 may be attached to the at least one input pin 120. The control hub 112 may be separate from the fluid detection fabric 102 or the control hub 112 may be integrated with the fluid detection fabric 102.

In one aspect, the initial voltage may be set low at output pin 118. If there is a surge or the circuit closes, the voltage increases. Thus, in at least one aspect, fluid leakage may be detected when voltage change is detected, such as going from a low voltage reading to a higher voltage reading.

In another aspect, the fluid detection system 100 may be configured to include a sleep mode, such as a low power mode, that may use only microamps from a power source, such as a battery, thereby allowing the system to operate for extended periods of time (e.g., 2-3 years) on a single battery. A low power mode or sleep configuration may include another output (sleep) pin where voltage may be read as high or elevated from the presence of fluid, which may wake up or alert the system 100 to run a sensing/detection confirmation algorithm using control hub 112.

Figure 5:
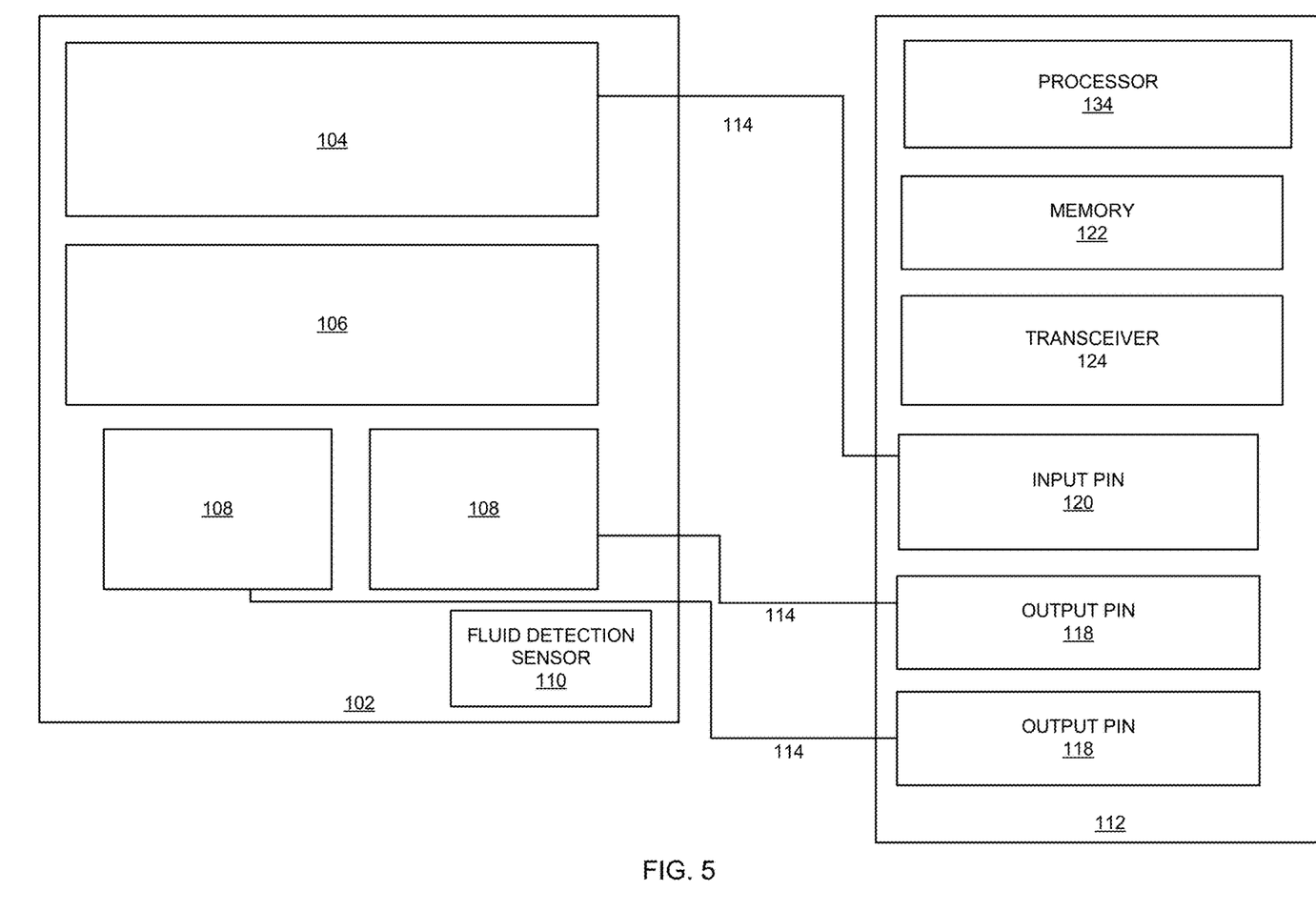
FIG. 5 is a pictorial representation of the fluid detection system in accordance with an exemplary aspect of the present disclosure.
Figure 6:
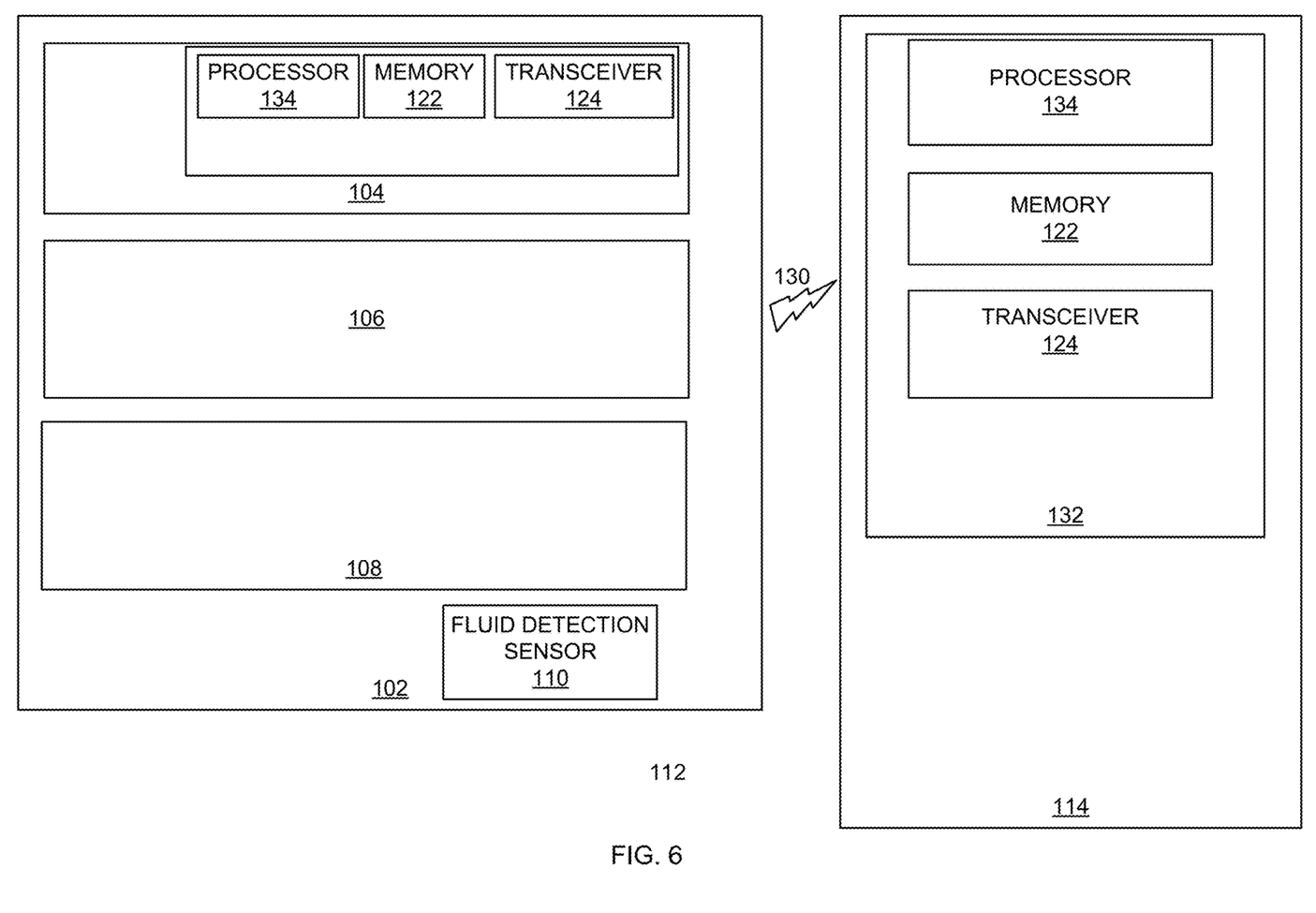
FIG. 6 is another pictorial representation of the fluid detection system in accordance with an exemplary aspect of the present disclosure.
Figure 7:
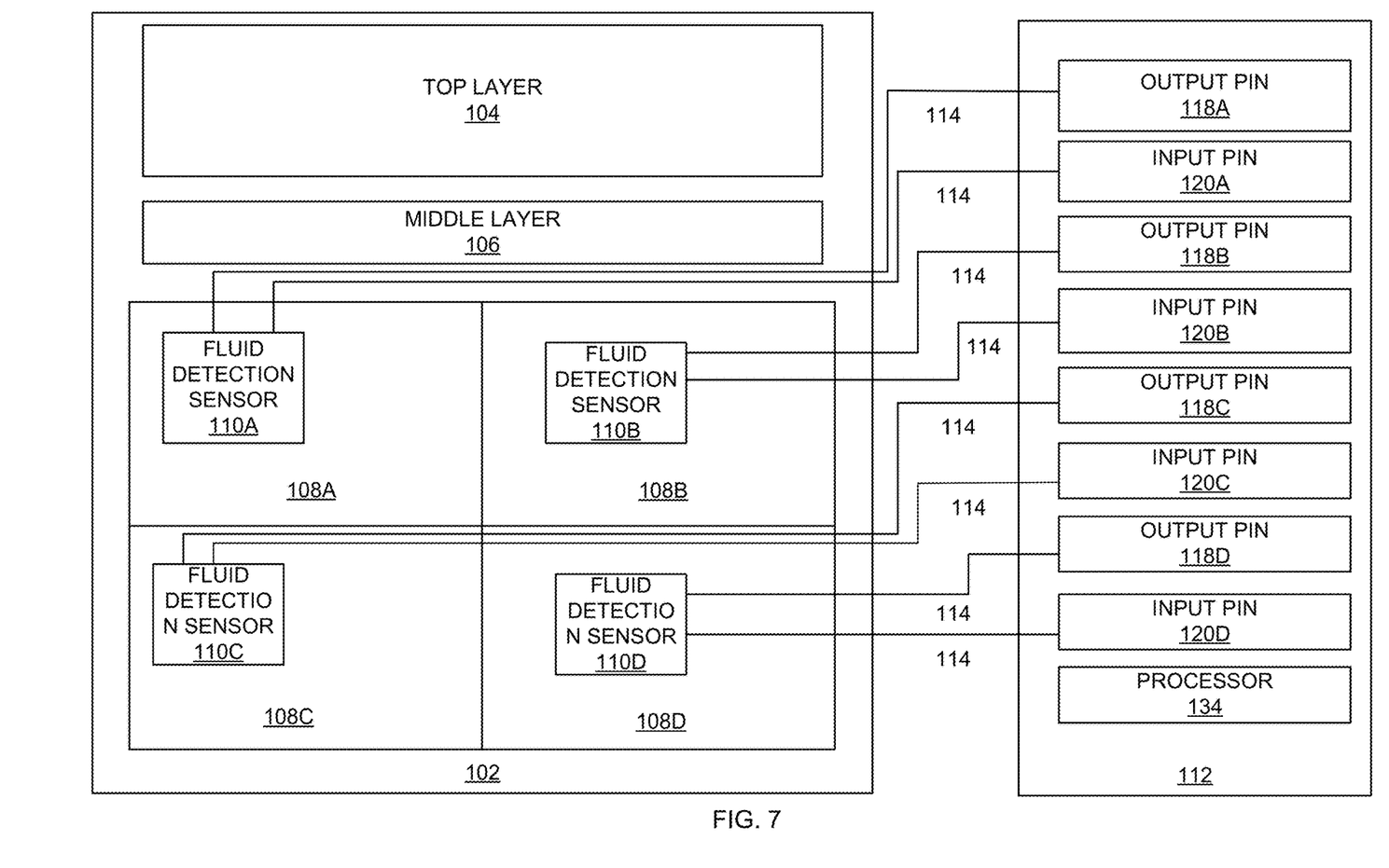
FIG. 7 is another pictorial representation of the fluid detection system in accordance with an exemplary aspect of the present disclosure.

The control hub 112 may be configured to include a memory 122, a transceiver 124, and a processor 134 as shown in FIGS. 5-7. The control hub may have a control hub housing 132. The housing may be waterproof to prevent fluid from entering the control hub housing 132 and damaging it. The control hub 112 may send the sensor data received from the fluid detection sensors 110 to a computer 126 or a server 128 or a data store to manage and process the data.

The control hub 112 may utilize short-range or long-range wireless communications to communicate with a computer 126, a server 128, or to the fluid detection fabric 102 through a wireless signal 130. For example, the control hub 112 may include a Bluetooth and/or cellular transceiver 124 within the embedded logical components. For example, the wireless signal 130 may be a Bluetooth, Wi-Fi, NFMI, Zigbee, Ant+, or other short-range wireless communication. The transceiver 124 may be disposed within the control hub housing 132 and operatively connected to the processor 126. The top layer 104 or the bottom layer 108 of the fluid detection fabric 102 may contain a transceiver 124.

The memory 122 may be operatively connected to the processor 134. The memory 122 may be disposed within the control hub housing 132. The memory 122 may represent static or dynamic memory. The memory 122 may include a hard disk, random access memory, cache, removable media drive, mass storage, or configuration suitable as storage for data, instructions, and information. In one aspect, the memory 122 and the processor 134 may be integrated. The memory 122 may use any type of volatile or non-volatile storage techniques and mediums. The memory 122 may store information related the fluid detection fabric 102 and the voltage reading. The memory 122 may display instructions, programs, drivers, or an operating system for controlling the control hub 112. The memory 122 may also store the thresholds. The top layer 104 and the bottom layer 108 of the fluid detection fabric 102 may include memories 122 as shown in FIG. 6.

The processor 134 may also be electrically connected or operatively connected to one or more fluid detection sensors 110, the one or more output pin 118, at least one input pin 120, the memory 122, and the transceiver 134. The processor 134 may be disposed within the control hub 112. The top layer 104 and the bottom layer 108 of the fluid detection fabric 102 may contain processors 134, as shown in FIG. 6. The processor 134 may analyze the voltage readings. The analysis may be a summary of the sensor measurements or a compilation of the sensor measurements over a period of time to determine how long the leak has occurred. This may include specifically identifying high values, low values, averages, ranges for readings, durations within particular ranges, and other information. The sensor measurements may be processed for subsequent analysis, determinations, or decisions implemented by control hub 112. If the control hub 112 detects a change in voltage, the control hub 112 may issue an alert that a leak has been detected. The alert may be audible, tactile, or transmitted to a computer or other remote device.

Fluid detection sensors 110 are a genre of sensors used to detect the presence of fluids such as water. Point-of-use fluid sensors can detect the presence of a fluid within a small unit area, such as a 1-inch diameter circle. Fluid detection cords, which can detect the presence of a fluid within a large area, use a cord or rope to detect the presence of a large amount of fluid. Ultrasonic sensors operate by transmitting sound waves that reflect from the liquid surface and are obtained by the sound fluid detection sensor. The soundwave fluid detection sensor measures the time interval between the transmitted and received signals, which is then converted into distance measurement with the help of electronic circuits within the soundwave fluid detection sensor thereby measuring the level of the liquid. Float fluid detection sensors work based on the change in resistance of a potentiometer within the sensor by the turning of a pulley or a spring-loaded shaft. Bubbler sensors, on the other hand, measure water level by detecting the pressure of air-filled tubes with an open, submerged bottom end. The static pressure at the end of the tubes is greater when the water level is high, and therefore more air pressure is required to fill the tube. Fluid leakage detection sensors 110 detect fluid leakage by monitoring the voltage. The input of this sensor can be the voltage whereas the output may be the switches, analog voltage signal, a current signal, or an audible signal. In some cases, the conductors 114 may act as the sensor. When the voltage conducted by the one or more output pins 118 is greater than the input pin 120, the control hub 112 may signal that there is a leak. The top layer 104, middle layer 106, and bottom layer 108 as well as the conductors 114 may act as the fluid detection sensor 110. In another aspect, the fluid detection fabric 102 may be configured to be the fluid detection sensor 110.

In at least one aspect, fluid detection sensitivity of the system 100 can be increased, such as to detect a drop or drops of fluid 140, by adding one or more solvents to one or more of the fluid detection layers/materials, such as by adding a solvent that makes the fluid detection layers/material more hydrophilic or more hydrophobic.

In some aspects of the present disclosure, the top layer 104 or bottom layer may include a fluid detection sensor 110, a control hub 112 with a control hub housing 132, a processor 134 disposed within the control hub housing 132, a transceiver 124, and a memory 122. The memory 122 and the transceiver 124 may be operatively connected to the processor 134. The fluid detection sensors 110 of the top layer 104 and the bottom layer 108 may be configured to measure the increase in voltage. The processor 134 of the top layer 104 or the bottom layer 108 may determine if a liquid leak is present on the fabric due to the increase in voltage. The transceiver 124 of the top layer 104 or the bottom layer 108 may communicate the sensor reading to a separate control hub 112 or a computer 126. In some aspects, the top layer 104, middle later 106, and bottom layer 108 may be the fluid detection sensor 110 and the fluid may be detected when all layers connect.

In some aspects, the bottom layer 108 may contain a grid, as shown in FIG. 7. In other aspects of the present disclosure, the top layer 104 or the middle layer 106, 106A, or 106B may contain a grid. The grid can detect leaks as well as a location of the leak. The bottom layer 108 may be configured to have two or more quadrants, such as, for example, quadrants 108A, 108B, 108C, 108D, where each quadrant separately detects a liquid leak thereby identifying with more particularity the location of the leak. Each quadrant may be electrically connected to a control hub 112 for detecting a leak in any one of the quadrants or each of the quadrants may be connected to the same control hub 112. Each quadrant may have an output pin, 118A, 118B, 118C, 118D and an input pin 120A, 120B, 120C, 120D, allowing the control hub 112 to detect where the leak is by determining which quadrant has an increased voltage. Each quadrant may share the same input pin 120, as shown in FIG. 5. Each quadrant may have a fluid detection sensor 110A, 110B, 110C, 110D. The fluid detection fabric 102 may have at least one input pin 120 and an output pin 118 for each quadrant. The number of quadrants can be increased to increase the accuracy of leak detection. Accuracy of detection is important for pinpointing the location of small leaks as opposed to the broader detection of identifying where a puddle is located. Using multiple quadrants for detection can be used as an indicator regarding the coverage and quantity of the leaking fluid, for example, if multiple quadrants are sensing fluid leakages.

The middle layer 106 may be configured to include one or more chemistries to change electrically, non-conductive liquids, such as water, to conductive liquids. Sodium, or other electrolytes may be added to the middle layer 106 that combines with the leaking fluid to create an electrically conductive fluid that can provide conductivity or a conductive pathway 138 between the top layer 104 and the bottom layer 108.

Figure 8:
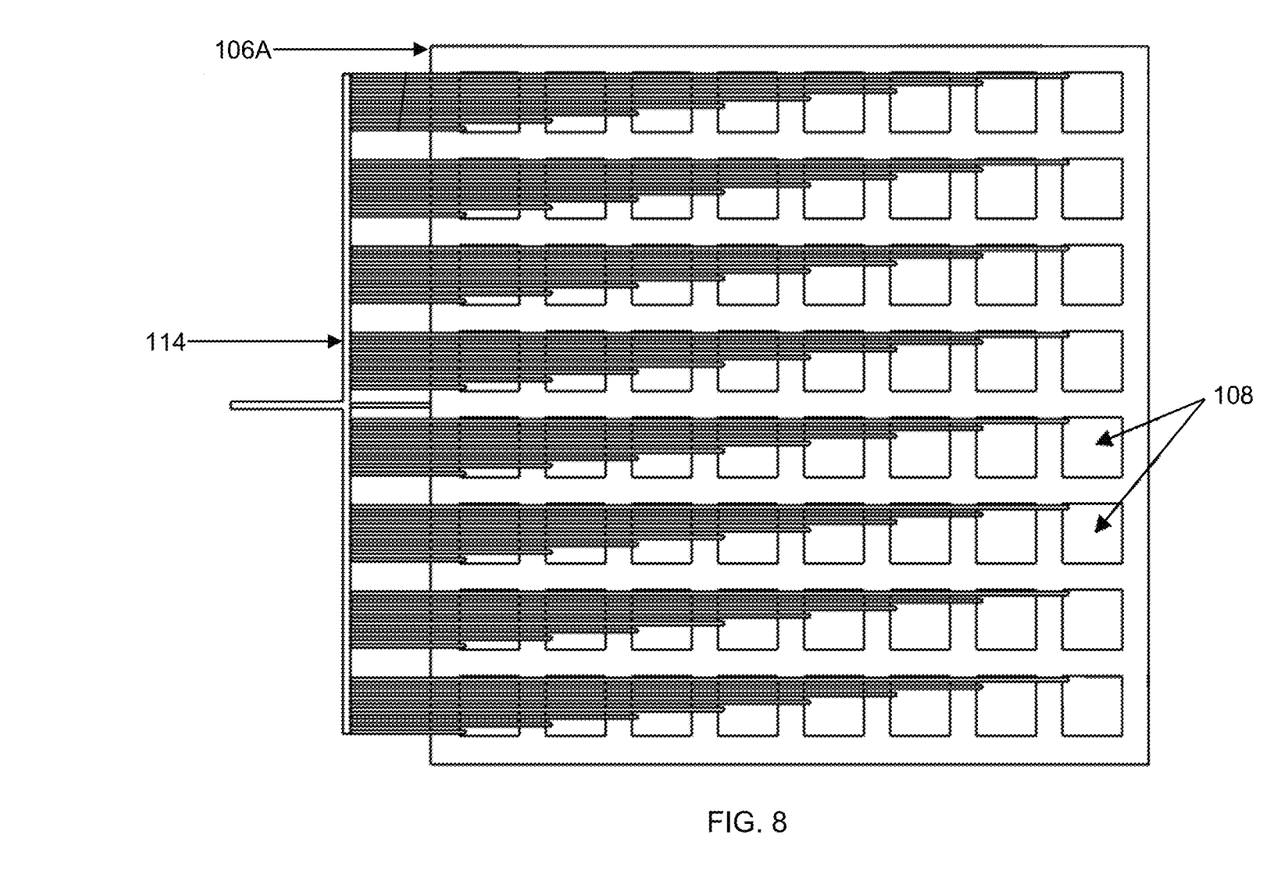
FIG. 8 is an illustration of the conductors.
Figure 9:
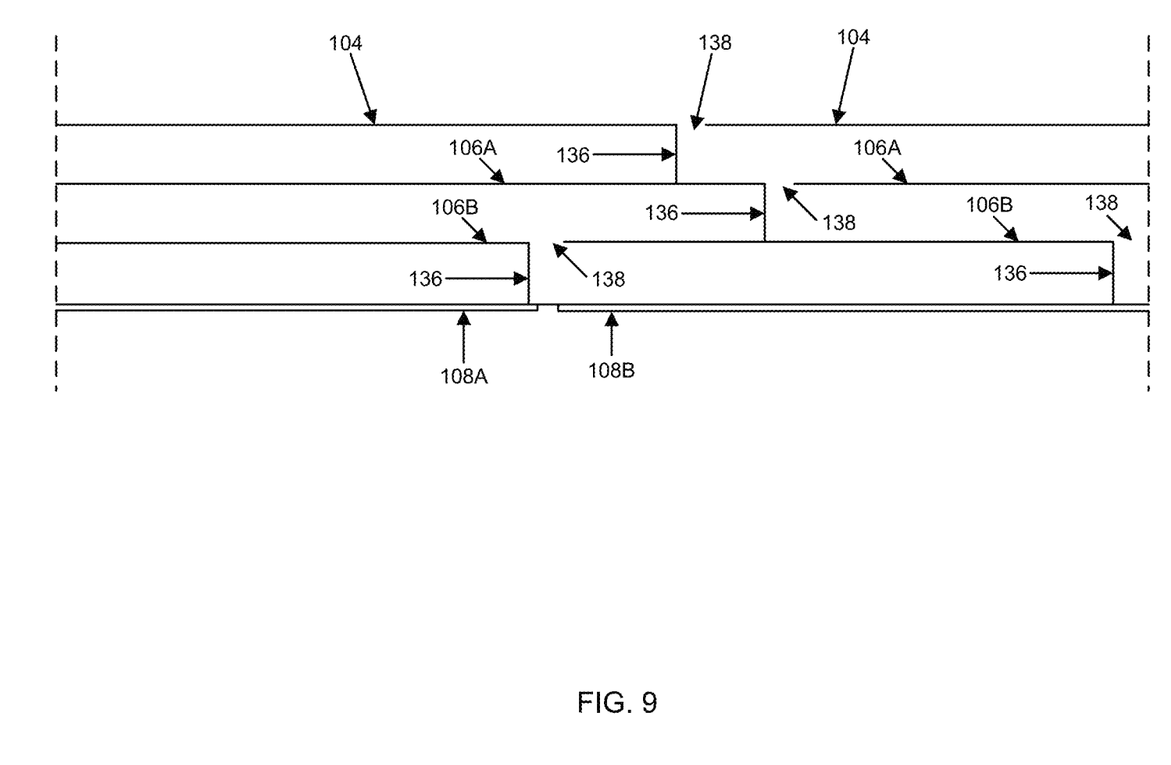
FIG. 9 is an illustration of the fluid pathway through the fluid detection fabric.
Figure 10:
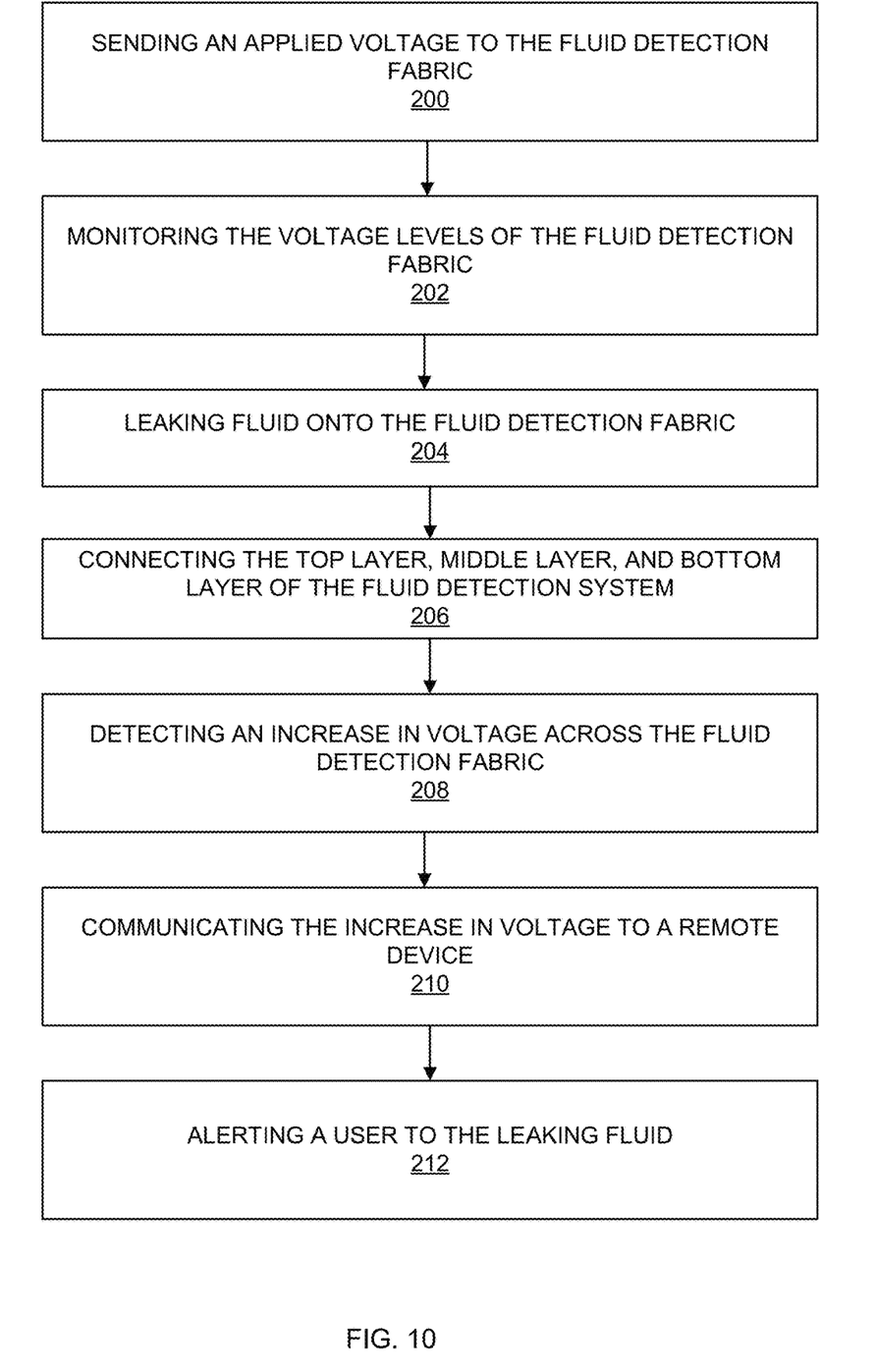
FIG. 10 is a flowchart of one method of detecting a liquid leak using the fluid detection system.

In one aspect, a method for detecting a fluid 140 leak utilizing the fluid detection systems is shown in FIG. 8. First, the input pin 120 may send an applied voltage to the fluid detection fabric 102 (Step 200). Next, the fluid detection sensor 110 may monitor the voltage by reading the output pin 118 (Step 202). Next, fluid 140 may leak on to the fluid detection fabric 102 (Step 204). The leak 140 may be a small quantity, such as under 0.1 mL. The leak 140 may start off leaking slowly and in one location on the fluid detection fabric 102 or over a large area. Next, all three layers 104, 106, 108 of the fluid detection fabric 102 may connect (Step 206) via a conductive pathway established between them via the fluid 140, such as the stitching 136. The connection of all three layers may cause an increase in voltage. The fluid detection sensor 110 may monitor the voltage and detect the increase in voltage through the output pin (Step 208). The processor 134 of the control hub 112 may analyze the voltage increase to determine if there is a leak (Step 210). If the output pin 118 has a higher voltage than the input pin 120, the processor 134 may determine that a leak is occurring and fluid is present on the fluid detection fabric 102. If the output pin 118 reads the same voltage level as the input pin 120, the processor may determine that a leak is not present. If the control hub 112 determines there is a leak, the control hub 112 may communicate an alert to a computer 126 or a server 128. The control hub 112 may audibly communicate the alert through speakers operatively connected to the processor 134. If the bottom layer 108 is separated into quadrants, the method may also include the step of determining a location of the leak and alerting the user to the location of the leak so the user does not have to search the large area for the leak.

The disclosure is not to be limited to the particular aspects described herein. In particular, the disclosure contemplates numerous variations in fluid leak detection. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of aspects, processes, or methods of the disclosure. It is understood that any other modifications, substitutions, and/or additions can be made, which are within the intended spirit and scope of the disclosure.

What is claimed is:

1. A fluid detection fabric, comprising:
 a top layer, a middle layer, and a bottom layer, a first conductor attached to the top layer, and at least one stitch, wherein the at least one stitch is configured to direct the fluid from the top layer to the middle layer and from the middle layer to the bottom layer, wherein the top layer, the middle layer and the bottom layer are configured to connect utilizing the at least one stitch if liquid leaks on at least one of the top layer, middle layer, and bottom layer;
 a fluid detection sensor having at least one second conductor connected to the bottom layer; and
 a control hub having an input pin connected to the first conductor, the input pin configured to apply a first voltage supplied by the control hub across the top layer, an output pin connected to the second conductor of the fluid detection sensor, the output pin configured to measure a second voltage across the bottom layer, wherein the second voltage is the voltage across the bottom layer after the fluid is introduced to the fluid detection fabric;
 wherein the fluid creates a conductive pathway from the input pin of the first conductor of the top layer through the middle layer to the bottom layer, electrically connecting the top layer to the bottom layer;
 wherein the conductive pathway of the top layer to the bottom layer increases the second voltage across the bottom layer;
 wherein the control hub is configured to detect the increase in the voltage across the second layer and detect the fluid by measuring a voltage reading of the second voltage using the output pin after the fluid is introduced.

2. The fluid detection fabric of claim 1, wherein the fluid adheres to the single stitch, allowing the fluid to travel from the top layer to the bottom layer connecting the top layer, middle layer, and bottom layer.

3. The fluid detection fabric of claim 1, wherein the control hub is configured to transmit voltage readings to an electronic device or data store.

4. The fluid detection fabric of claim 1, wherein the at least one stitch is configured to create a conductive pathway from the top layer to the bottom layer.

5. The fluid detection fabric of claim 1, wherein the bottom layer is comprised of a grid wherein the grid comprises quadrants, and wherein each quadrant is configured to detect the fluid.

6. The fluid detection fabric of claim 1, wherein a density of the at least one stitch determines a sensitivity of the fluid detection fabric.

7. The fluid detection fabric of claim 1, wherein the top layer and bottom layer include a conductive metal.

8. A fluid detection fabric, comprising:
 at least a top layer, a middle layer, a bottom layer and at least one conductive stitch;
 a control hub with an applied voltage and a first conductor connected to the fluid detection fabric, wherein the applied voltage is sent from the control hub through the first conductor to the top layer of the fluid detection fabric;
 a fluid detection sensor connected to the bottom layer of the fluid detection fabric and the control hub for detecting a fluid introduced to the fluid detection fabric, wherein fluid detection comprising a voltage reading monitored by the control hub;
 a conductive pathway created by the fluid introduced into the at least one conductive stitch from the top layer to the bottom layer, wherein the top layer, middle layer and the bottom layer of the fluid detection fabric is electrically connected by the introduction of the fluid;
 a conductor of the fluid detection sensor comprises an output pin of the control hub, wherein a voltage is sensed at the bottom layer of the fluid detection fabric by the conductor; and
 a processor of the control hub configured to determine that fluid is leaking on the fluid detection fabric utilizing the voltage sensed at the bottom layer by the conductor of the fluid detection sensor.

9. The fluid detection fabric of claim 8, wherein
 the control hub comprises a transceiver configured for transmitting the voltage reading to a remote device.

10. The fluid detection fabric of claim 8, wherein an orientation of the at least one conductive stitch directs fluid towards the bottom layer.

11. The fluid detection fabric of claim 8, wherein the top layer of the fluid detection fabric is a conductive material and wherein the bottom layer of the fluid detection fabric is a conductive material.

12. The fluid detection fabric of claim 8, wherein the bottom layer comprises a quadrant, and wherein each of the quadrants are configured to detect a liquid leak.

* * * * *